US008909283B2

United States Patent
Park et al.

(10) Patent No.: US 8,909,283 B2
(45) Date of Patent: Dec. 9, 2014

(54) TRANSMIT POWER ADJUSTMENT TO REDUCE A RELATIVE PHASE DISCONTINUITY

(71) Applicant: Telefonaktiebolaget L M Ericsson (publ), Stockholm (SE)

(72) Inventors: Chester Park, San Jose, CA (US); Kumar Balachandran, Pleasanton, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 201 days.

(21) Appl. No.: 13/645,632

(22) Filed: Oct. 5, 2012

(65) Prior Publication Data

US 2013/0089044 A1  Apr. 11, 2013

Related U.S. Application Data

(60) Provisional application No. 61/545,736, filed on Oct. 11, 2011.

(51) Int. Cl.
| | | |
|---|---|---|
| H04B 7/00 | (2006.01) | |
| H04W 52/32 | (2009.01) | |
| H04W 52/14 | (2009.01) | |
| H04W 52/28 | (2009.01) | |
| H04W 52/16 | (2009.01) | |

(52) U.S. Cl.
CPC ............ *H04W 52/16* (2013.01); *H04W 52/325* (2013.01); *H04W 52/146* (2013.01); *Y02B 60/50* (2013.01); *H04W 52/28* (2013.01)
USPC ........ 455/522; 375/297; 455/63.1; 455/114.2

(58) Field of Classification Search
CPC ..... H04B 17/003; H04L 43/08; H04W 52/04; H04W 52/14; H04W 52/146; H04W 52/16; H04W 52/18; H04W 52/24; H04W 52/241; H04W 52/243
USPC .......... 370/252, 310, 318, 328, 329; 375/297; 455/39, 517, 522, 63.1, 91, 114.2
See application file for complete search history.

(56) References Cited

U.S. PATENT DOCUMENTS

| | | | |
|---|---|---|---|
| 8,743,802 B2 * | 6/2014 | Anderson et al. ............. | 370/329 |
| 2008/0200203 A1 * | 8/2008 | Malladi et al. ................ | 455/522 |
| 2013/0176868 A1 * | 7/2013 | Gaal ............................. | 370/252 |
| 2014/0092877 A1 * | 4/2014 | Kazmi et al. .................. | 370/336 |

OTHER PUBLICATIONS

3GPP. 3rd Generation Partnership Project; Technical Specification Group Radio Access Network; Evolved Universal Terrestrial Radio Access (E-UTRA); Physical Layer Procedures (Release 10). 3GPP TS 36.213 v10.3.0. Sep. 2011.

* cited by examiner

*Primary Examiner* — Chi H Pham
*Assistant Examiner* — Weibin Huang

(57) ABSTRACT

A method and a serving NodeB for adjusting transmit power of a User Equipment (UE) having multiple transmitter chains to reduce relative phase discontinuity (RPD) between a Sounding Reference Signal (SRS) and a Physical Uplink Shared Channel (PUSCH). The NodeB receives from the UE, an RP characteristic of the UE and, based on the RP characteristic, selects an SRS or PUSCH transmit power level for the UE so as to reduce the RPD. The NodeB instructs the UE to set the SRS or PUSCH transmit power level to the level selected by the NodeB.

21 Claims, 5 Drawing Sheets

TRANSMIT POWER ADJUSTMENT TO REDUCE A RELATIVE PHASE DISCONTINUITY

CROSS-REFERENCE TO RELATED APPLICATIONS

This application claims the priority benefit under 35 U.S.C. §119(e) of U.S. Provisional Application No. 61/545,736 filed Oct. 11, 2011, the disclosure of which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present invention generally relates to wireless communication systems. More particularly, and not by way of limitation, particular embodiments of the present invention are directed to a method and a serving NodeB for adjusting transmit power of a User Equipment (UE) to reduce a relative phase discontinuity (RPD) between a Sounding Reference Signal (SRS) and transmissions on a Physical Uplink Shared Channel (PUSCH).

BACKGROUND

Multiple-Input Multiple-Output (MIMO) is a key element of the air interface for high-speed wireless communications for many wireless communication technologies such as Long Term Evolution (LTE) and High Speed Packet Access (HSPA). MIMO can use the diversity in the channel to provide multiplexing gain by enabling the simultaneous transmission of multiple streams known as layers. Denoting the number of transmit antennas, receive antennas, and layers by NT, NR, and R, respectively, R is bounded above by the minimum of NT and NR. One possible implementation of MIMO uses a precoder, often expressed mathematically as a left-multiplication of a layer signal vector (R×1) by a precoding matrix (NT×R), which is chosen from a codebook, i.e., a pre-defined set of matrices. Each precoding matrix is indexed by a rank indicator (RI) and a precoding matrix indicator (PMI). The r-th column vector of the precoding matrix represents the antenna spreading weight of the r-th layer. The precoding matrix usually consists of linearly independent columns, and thus R is referred to as the rank of the codebook. One purpose of this kind of precoder is to match the precoding matrix with the channel state information (CSI) so as to increase the received signal power and also to some extent reduce inter-layer interference, thereby improving the signal-to-interference-plus-noise-ratio (SINR) of each layer. Consequently, the precoder selection requires the transmitter to know the channel properties and, generally speaking, the more accurate the CSI, the better the precoder matches.

In the case of the 3GPP LTE uplink (UL), the receiver (NodeB) makes the precoder selection, so there is no need to feed channel information back to the transmitter. ("Precoder selection" includes not only rank selection, but also precoding matrix selection throughout this disclosure.) Instead, it is necessary for the receiver to obtain channel information, which can usually be facilitated by transmitting a known signal, in the case of LTE UL, the Demodulation Reference Signal (DM-RS) and the Sounding Reference Signal (SRS). Both DM-RS and SRS are defined in the frequency domain and are derived from the Zadoff-Chu sequence. However, since the DM-RS is precoded while the SRS is not precoded, the channel information obtained from DM-RS is the equivalent channel that the R layers experience, not the physical channel that the NT antennas experience, Mathematically, letting the NR×NT physical channel matrix, the NT×R precoding matrix, and the NR×R equivalent channel be denoted by H, W and E, respectively, it follows that:

$$E = HDW_t \quad (1)$$

where D is the $N_T \times N_T$ diagonal matrix whose diagonal elements represent a phase shift introduced by the transmitter chains. As will be seen later, the phase shift is not uniform and need not be constant. In detail, the i-th diagonal element is given as $d_i = \exp(j\phi_i)$. As will be shown in the next section, the phase shift may result in significant performance loss, when the relative phase between the transmitter chains changes from one phase of transmission to another, for example from SRS to the Physical Uplink Shared Channel (PUSCH).

Using the above notation, the equivalent channels for PUSCH, DM-RS and SRS denoted by $E_{PUSCH}$, $E_{DMRS}$ and $E_{SRS}$ can be expressed as:

$$E_{PUSCH} = HW$$

$$E_{DMRS} = HW$$

$$H_{SRS} = HD. \quad (2)$$

Here it is assumed that there is no channel variation among PUSCH, DM-RS, and SRS, and D is set to the identity matrix for PUSCH and DM-RS without loss of generality due to the fact that only relative phase variations are of concern. Note that it is also assumed that PUSCH and DM-RS experience the same channel. Also note that $H_{SRS}$ in equation (2) is directly obtained from SRS, and based on $H_{SRS}$, the equivalent channel $E_{SRS}$ as a function of a hypothesized precoder W can be obtained as $E_{SRS} = H_{SRS}W$.

Precoder selection is preferably based on SRS, since it is more easily done with complete knowledge of the channel, i.e., the physical channel, HD in equation (2). Based on the physical channel estimated based on SRS, the best transmission mode is chosen by the receiver and sent back to the transmitter. One of the criteria for selecting the transmission mode is to maximize the throughput. For example, the effective SNR is calculated for each precoder, i.e., each selection of the rank and precoder matrix, the relevant throughput is calculated, and the precoder that maximizes the throughput is selected. Consequently, it is easily understood that precoder selection is subject to inter-antenna imbalance variation between measurement period (SRS) and actual data transmission period (PUSCH).

SUMMARY

The present disclosure addresses problems that arise from the existing processes for adjusting transmit power. Consider, for example, a User Equipment (UE) with two transmit antennas for simplicity (although the following discussion is equally applicable to a UE with more than two transmit antennas). Relative phase (RP) is defined as the phase difference between two transmitter chains. Thus, denoting the absolute phases of transmitter branch #1 and #2 by $\phi_1(t)$ and $\phi_2(t)$, respectively, the RP is defined as $\delta\phi(t)=\phi_1(t)-\phi_2(t)$. Relative phase discontinuity (RPD) is defined as the time difference of RP between the SRS transmission phase and the data transmission phase on the PUSCH. Thus, the RPD is defined as the difference of RP between two time instants $t_1$ and $t_2$, i.e., $\delta\phi(t_1)-\delta\phi(t_2)$.

The RPD of a transmitter branch typically includes a power-dependent term and a time-dependent term. The power-dependent term depends on the transmit power, whereas the time-dependent term varies with time. From the viewpoint of modelling, the power-dependent term can be given as a function of the current transmit power, whereas the time-dependent term can be given as an additive random process.

The power-dependent RPD mainly comes from the power/configuration mode (i.e., operation mode) switching by which each transmitter branch switches the gain/bias state. The potential sources of the power-dependent RPD can be summarized as follows:

Power mode switching: Many state-of-the-art power amplifiers (PAs) switch the power mode according to the transmit power, in order to improve the power efficiency. Without extra design effort (or additional circuitry), the two transmitter branches tend to respond to the power mode switching differently, thereby resulting in RPD across the switching points.

Configuration mode switching: Depending on the transmit power, the Radio Frequency/Analog Baseband (RF/ABB) switches the configuration modes characterized by gain switching, adaptive biasing, signal path switching, and the like in order to reduce the power consumption. Without extra design effort (or additional circuitry), it is likely that the two transmitter branches experience different phase variation across the switching points. Therefore, the transmitter tends to experience non-negligible RPD in case of configuration mode switching.

AM-to-PM distortion: Since PAs are typically operated around the compression point to maximize the power efficiency, they may experience non-negligible AM-to-PM distortion without additional circuitry (for example, digital pre-distortion).

When it comes to precoder selection, the RPD of interest is the RPD between the measurement and the relevant precoding. Recalling that SRS is a natural choice for precoder selection, the RPD of interest can be seen as the RPD between the SRS transmission used for precoder selection and the subsequent PUSCH transmission applying the precoder. The RPD may lead to non-optimal precoder selection, even when the wireless channel is perfectly known to the NodeB. This may result in non-trivial performance loss, since the precoder selection typically relies on the phase information of the transmitter chains.

It follows that the time frame of interest is a few (or a few tens of) subframes. The time frame depends on the processing time (measurement and precoder selection) and the SRS periodicity. For example, if the processing time is 4 msec and the period of SRS transmission is 10 msec, a minimum of 8 msec and a maximum of 18 msec should be assumed as the time frame. Given such a time frame, the power-dependent term has a larger impact on RPD than the time-dependent term and thus the present disclosure focuses on how to cope with the power-dependent term.

Denoting the current transmit power by P(t), the absolute phase is given as:

$$\phi_1(t)=f_1(P(t))$$

$$\phi_2(t)=f_2(P(t)), \quad (3)$$

where $f_1(x)$ and $f_2(x)$ represent the power dependence of absolute phase for the two transmitter branches. Defining the power dependence of RP as $f_{1,2}(x)=f_1(x)-f_2(x)$, the corresponding RP is given as:

$$\delta\phi(t)=f_{1,2}(P(t)). \quad (4)$$

In other words, the RP is given as a function of the current transmit power. Similarly, the RPD between $t_1$ and $t_2$ is given as:

$$\delta\phi(t_1)-\delta\phi(t_2)=f_{1,2}(P(t_1))-f_{1,2}(P(t_2)). \quad (5)$$

Therefore, the RPD is given as a function of the transmit powers of the two time instants. In other words, it is the transmit power change that gives rise to the RPD. Thus, there is no RPD, if the transmit power does not change, i.e., $P(t_1)=P(t_2)$. Additionally, given a certain level of transmit power change, the resulting RPD will be affected by the power-dependence of RP. Of course, when the RP is independent of the transmit power, i.e., $f_{1,2}(P)=$(constant), there is no RPD.

Particular embodiments of the present disclosure provide for a transmit power adjustment that reduces the RPD. One example is the transmit power adjustment between SRS and PUSCH, and this helps keep the optimality of precoder selection.

The disclosed transmit power adjustment is two-fold: the adjustment of the SRS transmit power and the adjustment of the PUSCH transmit power. First, the SRS transmission (i.e., the relevant parameters) are configured so as to minimize the RPD. Second, the PUSCH transmit power is offset to minimize the RPD by adjusting the scheduling and/or the power control. In addition, the disclosed transmit power adjustment may be based on UE measurements or UE capabilities (UE-specific). The UE may feed back the relevant UE information (i.e., RP characteristic) to the eNodeB to assist in the RPD minimization.

In one embodiment, the present disclosure is directed to a method in a serving NodeB for adjusting transmit power of a UE having multiple transmitter chains to reduce RPD between an SRS and a PUSCH. The method includes the steps of receiving from the UE, an RP characteristic of the UE; based on the RP characteristic, selecting an SRS or PUSCH transmit power level for the UE so as to reduce the RPD; and instructing the UE to set the SRS or PUSCH transmit power level to the level selected by the NodeB.

In another embodiment, the present disclosure is directed to a NodeB in a wireless communication network for adjusting transmit power of a UE having multiple transmitter chains to reduce RPD between an SRS and a PUSCH. The NodeB includes a receiver configured to receive from the UE, an RP characteristic of the UE; a transmit power determination unit configured to select, based on the RP characteristic, an SRS or PUSCH transmit power level for the UE so as to reduce the RPD; and a transmitter configured to transmit an instruction to the UE to set the SRS or PUSCH transmit power level to the level selected by the NodeB.

The present disclosure also applies more generically to any two radio communication nodes in which a radio receiver in a second node transmits at different power levels during two phases of transmission, and a first node instructs the second node to set its transmit power level at a level selected by the first node. Thus, in this embodiment, the present disclosure is directed to a method in a first radio communication node for instructing a second radio communication node to adjust a transmit power level of a radio transceiver in the second radio communication node to reduce RPD between first and second phases of transmission by the radio transceiver, wherein the transmit power level during the first phase of transmission is different than the transmission power level during the second phase of transmission. The method includes the steps of receiving from the second radio communication node, an RP characteristic of the radio transceiver in the second radio communication node; based on the RP characteristic, selecting by the first radio communication node, the transmit power level for the radio transceiver in the second radio communication node for a selected one of the two phases of transmission, so as to reduce the RPD between the first and second phases of transmission; and instructing the second radio communication node to set the transmit power level for the radio transceiver during the selected phase of transmission to the level selected by the first radio communication node.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the disclosed invention may be practiced without these specific details. In other instances, well-known methods, procedures, components and circuits have not been described in detail so as not to obscure the present disclosure. Additionally, it should be understood that although the disclosure is described primarily in the context of the uplink channel of 3GPP LTE cellular network, this should not be seen as limiting the scope of the invention to only the aforementioned system. Other wireless systems, including WCDMA, WiMax, UMB, GSM and WLAN, may also benefit from exploiting the ideas presented within this disclosure.

Terminologies such as NodeB and UE should be considered non-limiting and does not imply a certain hierarchical relation between the two; in general, "NodeB" could be considered as device 1 and "UE" device 2, and these two devices communicate with each other over some radio channel.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments.

Figure 1:
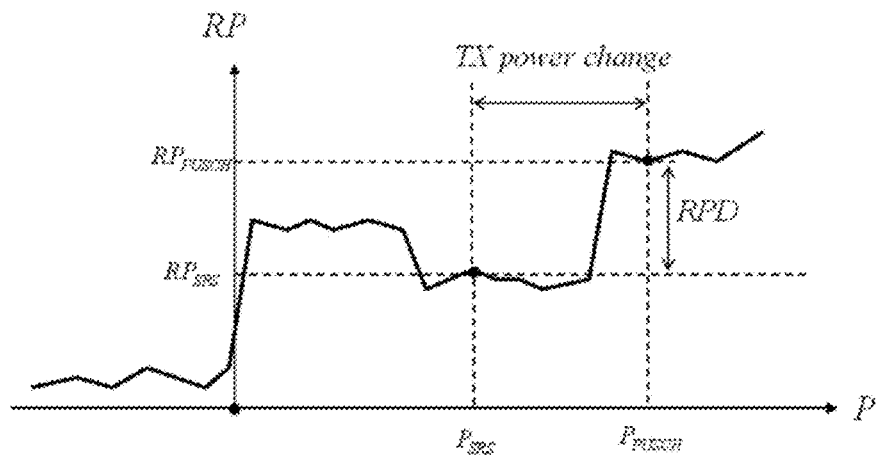
FIG. 1 is a graph of relative phase (RP) as a function of transmit power (P) of a UE, illustrating a relative phase discontinuity (RPD)

FIG. 1 is a graph of relative phase (RP) as a function of transmit power (P) of a UE, illustrating a relative phase discontinuity (RPD). The RPD occurs when the transmit power changes abruptly across a few transmit power levels—referred to as switching points hereafter. In FIG. 1, the SRS transmit power and the PUSCH transmit power are on the opposite side of a switching point, thereby introducing nontrivial RPD.

Figure 2:
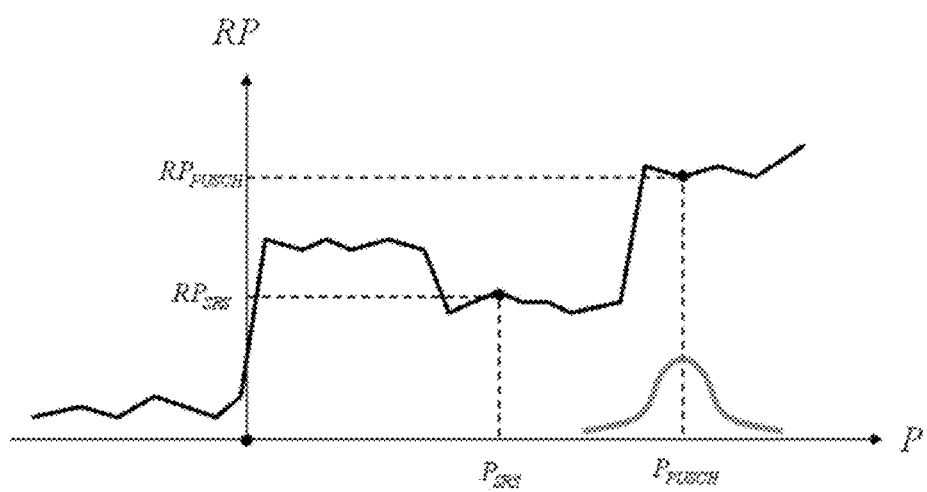
FIG. 2 is a graph of RP as a function of P of a UE, illustrating the distribution of the PUSCH transmit power.

FIG. 2 is a graph of RP as a function of P of a UE, illustrating the distribution of the PUSCH transmit power. Note that the SRS transmit power does not vary significantly during the time frame of interest (a few~a few tens of subframes), except for UEs with extremely-high mobility. On the other hand, the PUSCH transmit power varies more dynamically during the same time frame, for example, due to the resource allocation determined by the scheduler. Therefore, the PUSCH transmit power is distributed around the mean power.

Figure 3:
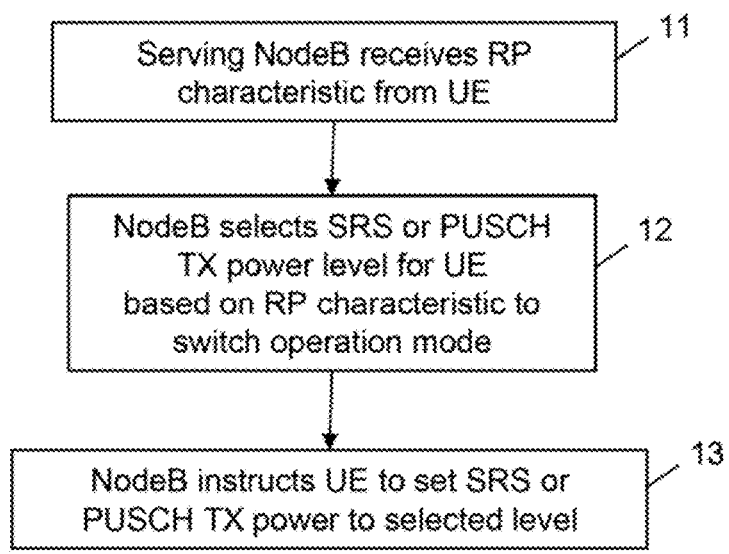
FIG. 3 is a flow chart illustrating an exemplary embodiment of an overall method for adjusting transmit power of a UE to achieve RP continuity.

FIG. 3 is a flow chart illustrating an exemplary embodiment of an overall method for adjusting transmit power of a UE to achieve RP continuity. At step 11, the serving NodeB receives from the UE, an RP characteristic of the UE. The RP characteristic may be measurements (i.e., the RP level as well as the power levels) of switching points of multiple transmitter branches in the UE (the switching points being defined as the transmit power levels at which the transmitter (e.g., power amplifiers) in the UE experience RP larger than a certain threshold) or power levels of the switching points. Alternatively, or in addition, the RP characteristic may be UE capabilities such as the UE's power amplifier (PA) type or information indicating the number of switching points whose RP exceeds a predefined level. The NodeB may store the RP characteristic of the UE and update the stored RP characteristic when new RP characteristic information is received from the UE.

At step 12, based on the RP characteristic, the NodeB selects an SRS or PUSCH transmit power level for the UE so as to switch the UE's operation mode, or, at least, to reduce the RPD. This may be done based on stored and updated RP characteristics. The NodeB may select an SRS or PUSCH transmit power level that causes the SRS and PUSCH transmit powers to belong to the same operation mode. Alternatively, the NodeB may select an SRS or PUSCH transmit power level that switches the UE's operation mode and reduces the relative phase discontinuity (RPD) between the SRS and PUSCH. At step 13, the NodeB instructs the UE to set the SRS or PUSCH transmit power level to the level selected by the NodeB. This may be done, for example, by sending a Transmit Power Control (TPC) command from the serving NodeB to the UE.

Figure 4:
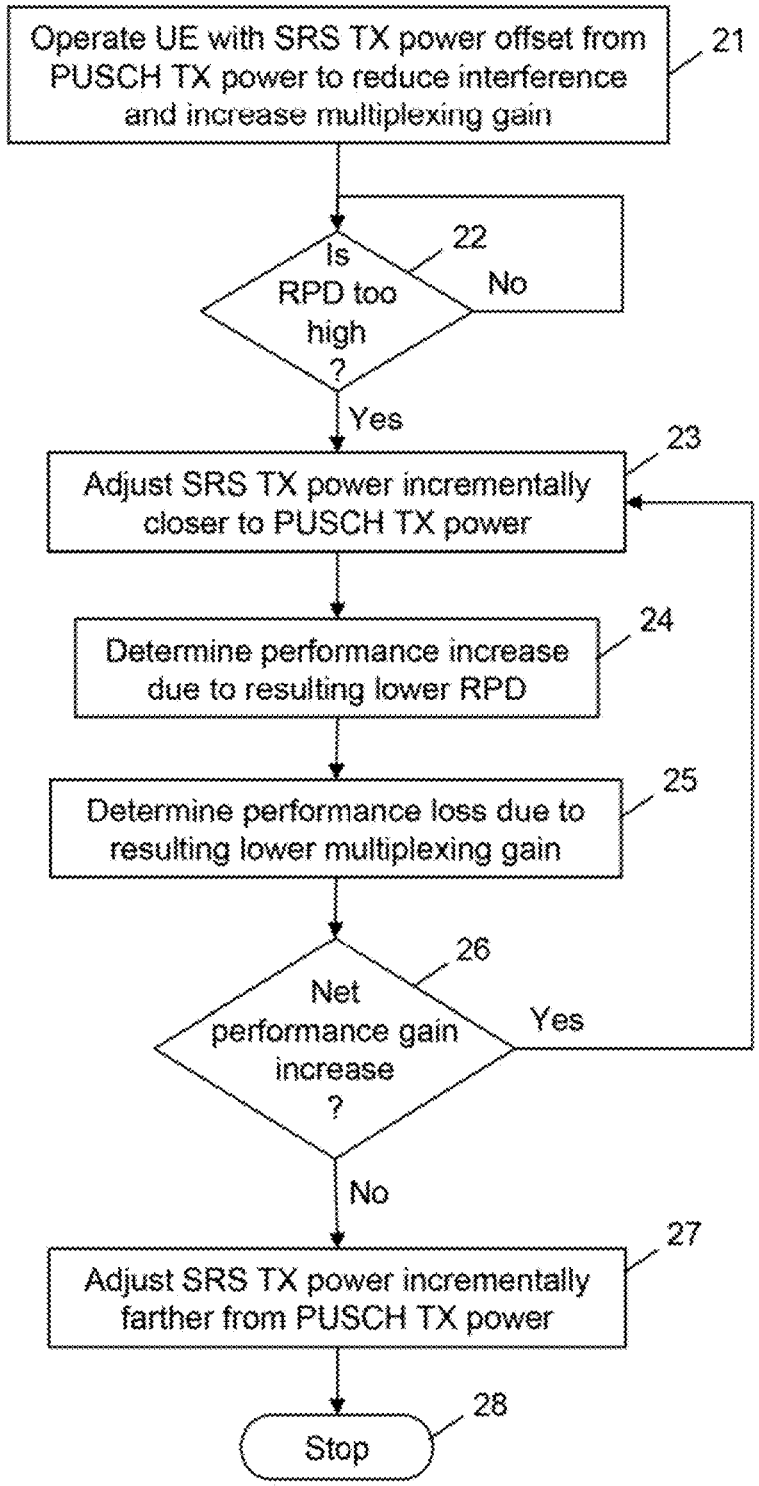
FIG. 4 is a flow chart of an exemplary embodiment of a method in which the SRS transmit power is moved closer to the PUSCH transmit power.

FIG. 4 is a flow chart of an exemplary embodiment in which the SRS transmit power is moved closer to the PUSCH transmit power. According to the power control procedures specified in 3GPP TS 36.213, "3GPP; Technical specification group radio access network E-UTRA; Physical layer procedure", it is possible to move the SRS transmit power by changing the SRS bandwidth and the SRS power offset. Since these parameters are originally introduced for different purposes, the change of the parameters should be limited so that it can avoid degrading system performance. For example, the SRS power offset is typically set to a negative number to reduce interference and thus increase the multiplexing gain. Therefore, the SRS power offset should be set based on the trade-off between RPD and multiplexing gain.

At step 21, the UE is initially operated with the SRS transmit power set to a level offset from the PUSCH transmit level to reduce interference and increase multiplexing gain. At step 22, it is determined whether RPD is too high. If not, no changes are made and the system continues to monitor the RPD level. If the RPD level is determined to be too high, the method moves to step 23 where the NodeB instructs the UE to adjust the SRS transmit power incrementally closer to the PUSCH transmit power. At step 24, the NodeB determines the performance increase due to the resulting lower RPD. At step 25, the NodeB determines the performance loss due to the resulting lower multiplexing gain. At step 26, it is determined whether there is a net performance gain increase. If so, the method returns to step 23 where the NodeB again instructs the UE to adjust the SRS transmit power incrementally closer to the PUSCH transmit power. This process continues to move the SRS transmit power incrementally toward the PUSCH transmit power until the SRS transmit power reaches an optimum level where the net performance gain increase is maximized. When an incremental adjustment of the SRS transmit power does not result in a net performance gain increase at step 26 (i.e., the performance gain increase either stays the same or decreases), the method moves to step 27 where the NodeB instructs the UE to adjust the SRS transmit power incrementally farther from the PUSCH transmit power. This ensures the net performance gain increase is maximized. The method then stops at 28.

Figure 5:
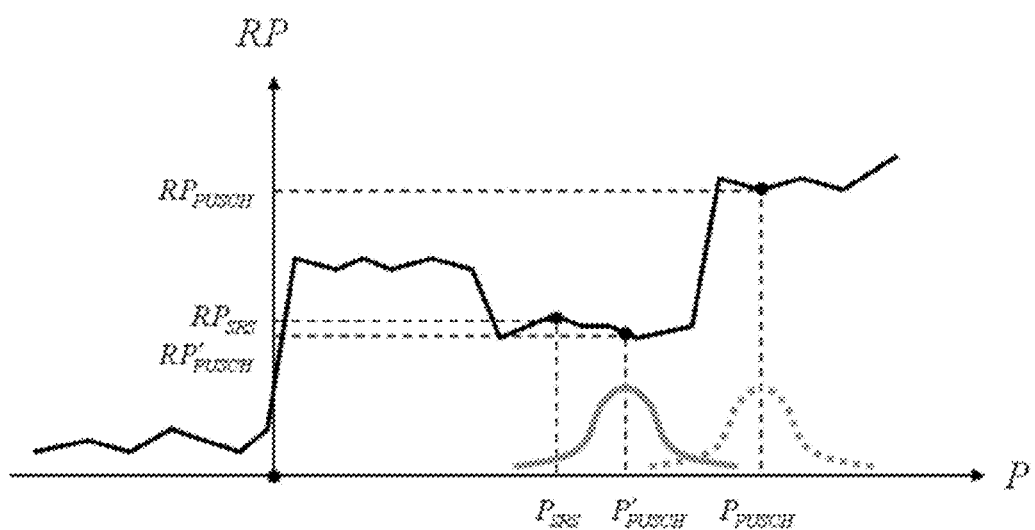
FIG. 5 is a graph of RP as a function of P of a UE, illustrating a procedure for adjusting the PUSCH transmit power closer to the SRS transmit power.

FIG. 5 is a graph of RP as a function of P of a UE, illustrating a procedure for adjusting the PUSCH transmit power closer to the SRS transmit power. As specified in 3GPP TS 36.213, the PUSCH transmit power can be adjusted by sending a Transmit Power Control (TPC) command to the UE. The TPC command should be set so that it can avoid degrading the performance. Likewise, the TPC command should be set based on the trade-off between RPD and power control accuracy. One advantage of the PUSCH transmit power adjustment over the SRS transmit power adjustment is that it can, in principle, reduce the RPD on a per-subframe basis. (Note that the SRS bandwidth and the SRS power offset cannot reduce the RPD dynamically, since they are only semi-statically configured.) In FIG. 5, the SRS transmit power is lower than the PUSCH transmit power, but this is not always true since SRS power may be higher than PUSCH power, for example, when PUSCH bandwidth is wider than SRS bandwidth and/or SRS power offset.

The SRS or PUSCH transmit power may need to be adjusted at the expense of SRS multiplexing gain or scheduling/link adaptation gain. However, it should be noted that even a small transmit power change may help reduce RPD significantly. Since RP abruptly changes around switching points, even some partial or rough knowledge on the switching points may help the NodeB to reduce RPD by slightly adjusting the SRS or PUSCH transmit power (without sacrificing either SRS multiplexing gain or scheduling/link adaptation), when it is fed back to the eNB.

The disclosed transmit power adjustment requires that the NodeB knows the relationship between RPD and transmit power of the UE or, at least, the power levels of the switching points. (In some approaches, it would suffice to know the power levels of the switching points. It is possible to adjust the SRS or PUSCH power level and reduce RPD even without knowing the RP levels of the switching points.) Since RPD varies across different UEs (i.e., spread over different devices), the NodeB may keep track of the RPD information of each UE. Therefore, each UE may measure its RPD for different transmit power levels or, at least, the power levels of the switching points and feed the information back to the NodeB. The measurement of RPD may be done periodically between consecutive communications with the NodeB and may be included in the radio calibration procedure. The measurement results may be stored inside UE and updated periodically. Alternatively, the UE may measure the RPD or, at least, the power levels of the switching points without a separate calibration procedure and simply rely on the actual communication period (presumably, at the expense of less accurate measurement).

It may be more practical to adjust the transmit power based on the signaling of UE capability information, which is already determined at the time of manufacture. Therefore, this does not require any measurement on the UE side. The UE capability includes the Power Amplifier (PA) type, for example switch-mode PA or envelope-tracking PA. If the UE is equipped with a switch-mode PA (which switches the power mode), then the NodeB adjusts the SRS or PUSCH transmit power to reduce the RPD. If the UE is equipped with an envelope-tracking PA (which does not switch the power mode, as opposed to a switch-mode PA), then the NodeB does not adjust the SRS or PUSCH transmit power.

The UE capability also includes the power levels of the switching points or, simply, the number of the switching points. The NodeB may have some information on how to map the number of the switching points to the power levels of the switching points (and, possibly, to the RP levels of the switching points). The NodeB may be able to use this information directly to reduce RPD, especially when the measurement from the UE is not available to the NodeB, although the power levels of the switching points may be less accurate than actual measurement.

In addition, the UE capability includes the number of switching points whose RP step (i.e., the RP difference between the two power modes) exceeds a certain pre-defined level. For example, a certain UE has no switching point for RP step>30 degrees and one switching point for RPD>15 degrees and three switching points for RPD>5 degrees. This implies that each switching point introduces less than 30 degrees of RPD. Once the NodeB is signaled of the UE capability, it may be able to decide whether it needs to adjust the SRS or PUSCH transmit power in the subsequent subframe, depending on the scheduling and power control algorithm.

Figure 6:
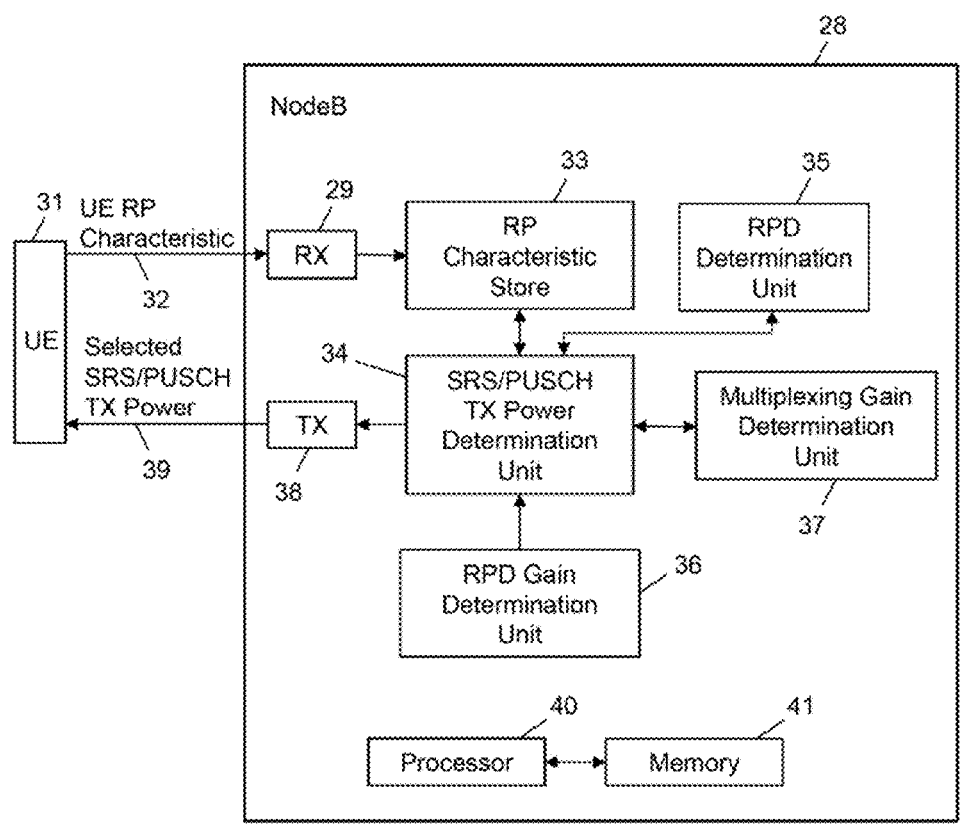
FIG. 6 is a simplified block diagram of a NodeB in an exemplary embodiment of the present disclosure.

FIG. 6 is a simplified block diagram of a NodeB 28 in an exemplary embodiment of the present disclosure. A receiver 29 receives from a UE 31, an RP characteristic 32 of the UE as described above in reference to FIG. 3. The NodeB may store the RP characteristic of the UE in an RP characteristic store 33, and may update the stored RP characteristic when new RP characteristic information is received from the UE. An SRS/PUSCH TX power determination unit 34 acquires the RP characteristic and based on the RP characteristic, determines an SRS or PUSCH transmit power level for the UE so as to switch the UE's operation mode when the RPD reported by an RPD determination unit 35 is too high. The SRS/PUSCH TX power determination unit also coordinates with an RPD gain determination unit 36 to determine an increase in system performance resulting from the change in RPD caused by a proposed change in the SRS or the PUSCH transmit power. The SRS/PUSCH TX power determination unit 34 may adjust the SRS transmit power level closer to the PUSCH transmit power by changing a bandwidth, a power offset of the SRS, etc. If the SRS transmit power is adjusted, the SRS/PUSCH TX power determination unit may also coordinate with a multiplexing gain determination unit 37 to determine a change in the multiplexing gain, and resulting performance loss. The SRS/PUSCH TX power determination unit 34 may trade-off the effects on RPD and multiplexing gain to achieve optimum transmit power levels for the SRS and PUSCH transmit powers, as shown in FIG. 4.

Note that the procedure related to this trade-off may also be carried out between the eNB 31 and the UE 28. For example, the eNB may adjust the SRS transmit power level closer to the PUSCH transmit power and measure the resulting UL performance, for example, based on the DM-RS measurement. In this scenario, the eNB keeps adjusting the SRS transmit power closer to the PUSCH transmit power until the SRS transmit power reaches the power level where it starts decreasing the UL performance.

The SRS/PUSCH TX power determination unit 34 may adjust the PUSCH transmit power level by adjusting the scheduling and/or the power control. However, adjusting the PUSCH transmit power may cause a degradation in power control accuracy. In this case, the SRS/PUSCH TX power determination unit may perform a trade-off between RPD improvement and degraded power control accuracy.

The SRS/PUSCH TX power determination unit 34 may select an SRS or PUSCH transmit power level that causes the SRS and PUSCH transmit powers to belong to the same operation mode. Alternatively, the SRS/PUSCH TX power determination unit may select an SRS or PUSCH transmit power level that switches the UE's operation mode and reduces the RPD between the SRS and PUSCH. A transmitter 38 sends the selected SRS/PUSCH TX power 39 to the UE with an instruction to set the SRS or PUSCH transmit power level to the selected level. This may be done, for example, by sending a Transmit Power Control (TPC) command from the serving NodeB 28 to the UE.

Operation of the NodeB 28 may be controlled, for example, by a processor 40 configured to execute computer program instructions stored on a non-transitory memory 41 coupled thereto.

It should be noted that in practice, the RPD of a UE does not always increase with the power change, since the relationship between RPD and transmit power depends on the switching points and the corresponding phase shifts. This implies that RPD is not always reduced by moving the SRS transmit power and the PUSCH transmit power closer to each other. Thus, it is sometimes possible to reduce the RPD without sacrificing the system performance, for example, the SRS multiplexing gain mentioned previously. In other words, it is sometimes desirable to push the SRS transmit power and the PUSCH transmit power far away from each other. Such a decision should be based on either the UE measurement or the UE requirement. This justifies the usefulness of the aforementioned UE feedback on the RPD capability.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a serving NodeB for adjusting transmit power of a User Equipment (UE) having multiple transmitter chains to reduce a relative phase discontinuity (RPD) between a Sounding Reference Signal (SRS) and a Physical Uplink Shared Channel (PUSCH), the method comprising the steps of:

receiving from the UE, a Relative Phase (RP) characteristic of the UE;
   based on the RP characteristic, selecting an SRS or PUSCH transmit power level for the UE so as to reduce the RPD; and
   instructing the UE to set the SRS or PUSCH transmit power level to the level selected by the NodeB.

2. The method as recited in claim 1, further comprising the steps of:
   the NodeB storing the RP characteristic of the UE; and
   the NodeB updating the stored RP characteristic when new RP characteristic information is received from the UE;
   wherein the SRS or PUSCH transmit power level for the UE is selected based on the updated stored RP characteristic.

3. The method as recited in claim 1, wherein the step of selecting an SRS or PUSCH transmit power level for the UE includes selecting an SRS or PUSCH transmit power level that causes the SRS and PUSCH transmit powers to belong to the same operation mode.

4. The method as recited in claim 1, wherein the step of selecting an SRS or PUSCH transmit power level for the UE includes selecting an SRS or PUSCH transmit power level that switches the UE's operation mode and reduces the RPD between the SRS and PUSCH.

5. The method as recited in claim 1, wherein the step of receiving the RP characteristic of the UE includes receiving at least one of:
   measurements of switching points of the multiple transmitter chains in the UE;
   measurements of the power levels of the switching points; and
   UE capability information.

6. The method as recited in claim 5, wherein the UE capability information includes at least one of:
   information indicating the UE's power amplifier (PA) type;
   measurements of power levels of switching points of the UE; and
   information indicating the number of switching points having an RP that exceeds a predefined level.

7. The method as recited in claim 1, wherein the instructing step includes instructing the UE to move the SRS transmit power closer to the PUSCH transmit power by changing a bandwidth and a power offset of the SRS.

8. The method as recited in claim 7, wherein changing the power offset of the SRS causes a degradation in multiplexing gain, and the step of changing the bandwidth and the power offset of the SRS includes performing a trade-off between RPD improvement and multiplexing gain degradation when changing the power offset of the SRS.

9. The method as recited in claim 1, wherein the instructing step includes sending a Transmit Power Control (TPC) command from the serving NodeB to the UE instructing the UE to adjust the PUSCH transmit power closer to the SRS transmit power.

10. The method as recited in claim 9, wherein changing the PUSCH transmit power causes a degradation in power control accuracy, and the step of sending the TPC command from the serving NodeB to the UE includes setting the TPC command based on a trade-off between RPD improvement and degraded power control accuracy when adjusting the PUSCH transmit power.

11. A NodeB in a wireless communication network for adjusting transmit power of a User Equipment (UE) having multiple transmitter chains to reduce a relative phase discontinuity (RPD) between a Sounding Reference Signal (SRS) and a Physical Uplink Shared Channel (PUSCH), the NodeB comprising:

a receiver configured to receive from the UE, a Relative Phase (RP) characteristic of the UE;

a transmit power determination unit configured to select, based on the RP characteristic, an SRS or PUSCH transmit power level for the UE so as to reduce the RPD; and a transmitter configured to transmit an instruction to the UE to set the SRS or PUSCH transmit power level to the level selected by the NodeB.

12. The NodeB as recited in claim 11, wherein the transmit power determination unit is configured to select the SRS or PUSCH transmit power level for the UE by selecting an SRS or PUSCH transmit power level that causes the SRS and PUSCH transmit powers to belong to the same operation mode.

13. The NodeB as recited in claim 11, wherein the transmit power determination unit is configured to select the SRS or PUSCH transmit power level for the UE by selecting an SRS or PUSCH transmit power level that switches the UE's operation mode and reduces the RPD between the SRS and PUSCH.

14. The NodeB as recited in claim 11, wherein the RP characteristic of the UE includes at least one of:

measurements of switching points of multiple transmitter chains in the UE;

measurements of the power levels of the switching points; and

UE capability information.

15. The NodeB as recited in claim 14, wherein the UE capability information includes at least one of:

information indicating the UE's power amplifier (PA) type;

power levels of switching points of the UE; and information indicating the number of switching points having an RP that exceeds a predefined level.

16. The NodeB as recited in claim 11, wherein the instruction to the UE instructs the UE to adjust the SRS transmit power closer to the PUSCH transmit power by changing a bandwidth and a power offset of the SRS.

17. The NodeB as recited in claim 16, wherein changing the power offset of the SRS causes a degradation in multiplexing gain, and the transmit power determination unit is configured to perform a trade-off between RPD improvement and multiplexing gain degradation when adjusting the power offset of the SRS.

18. The NodeB as recited in claim 11, wherein the instruction to the UE instructs the UE to adjust the PUSCH transmit power closer to the SRS transmit power.

19. The NodeB as recited in claim 18, wherein changing the PUSCH transmit power causes a degradation in power control accuracy, and the transmit power determination unit is configured to perform a trade-off between RPD improvement and degraded power control accuracy when adjusting the PUSCH transmit power.

20. A method in a first radio communication node for instructing a second radio communication node to adjust a transmit power level of a radio transceiver in the second radio communication node to reduce a Relative Phase Discontinuity (RPD) between first and second phases of transmission by the radio transceiver, wherein the transmit power level during the first phase of transmission is different than the transmission power level during the second phase of transmission, the method comprising the steps of:

receiving from the second radio communication node, a Relative Phase (RP) characteristic of the radio transceiver in the second radio communication node;

based on the RP characteristic, selecting by the first radio communication node, the transmit power level for the radio transceiver in the second radio communication node for a selected one of the two phases of transmission, so as to reduce the RPD between the first and second phases of transmission; and instructing the second radio communication node to set the transmit power level for the radio transceiver during the selected phase of transmission to the level selected by the first radio communication node.

21. The method as recited in claim 20, wherein:

the first and second radio communication nodes operate in a Long Term Evolution (LTE) radio access network;

the first radio communication node is a NodeB;

the second radio communication node is a User Equipment (UE);

the first phase of transmission is transmission by the UE of a Sounding Reference Signal (SRS); and the second phase of transmission is transmission by the UE on a Physical Uplink Shared Channel (PUSCH).

* * * * *

UNITED STATES PATENT AND TRADEMARK OFFICE
CERTIFICATE OF CORRECTION

PATENT NO.         : 8,909,283 B2                                          Page 1 of 1
APPLICATION NO.    : 13/645632
DATED              : December 9, 2014
INVENTOR(S)        : Park et al.

It is certified that error appears in the above-identified patent and that said Letters Patent is hereby corrected as shown below:

In the Specification

Column 2, Line 11, delete "antennas experience," and insert -- antennas experience. --, therefor.

Column 4, Line 24, delete "$f_{1,2}(P)$=(constant)," and insert -- $f_{1,2}(P)$= C (constant), --, therefor.

Column 6, Line 61, delete "network" and insert -- network; --, therefor.

Column 9, Line 7, delete "eNB 31 and the UE 28." and insert -- eNB 28 and the UE 31. --, therefor.

Signed and Sealed this
Twenty-first Day of July, 2015

Michelle K. Lee
*Director of the United States Patent and Trademark Office*